Sept. 26, 1933.  A. L. GAGNON  1,928,528
DEPTH GAUGE
Filed July 7, 1931
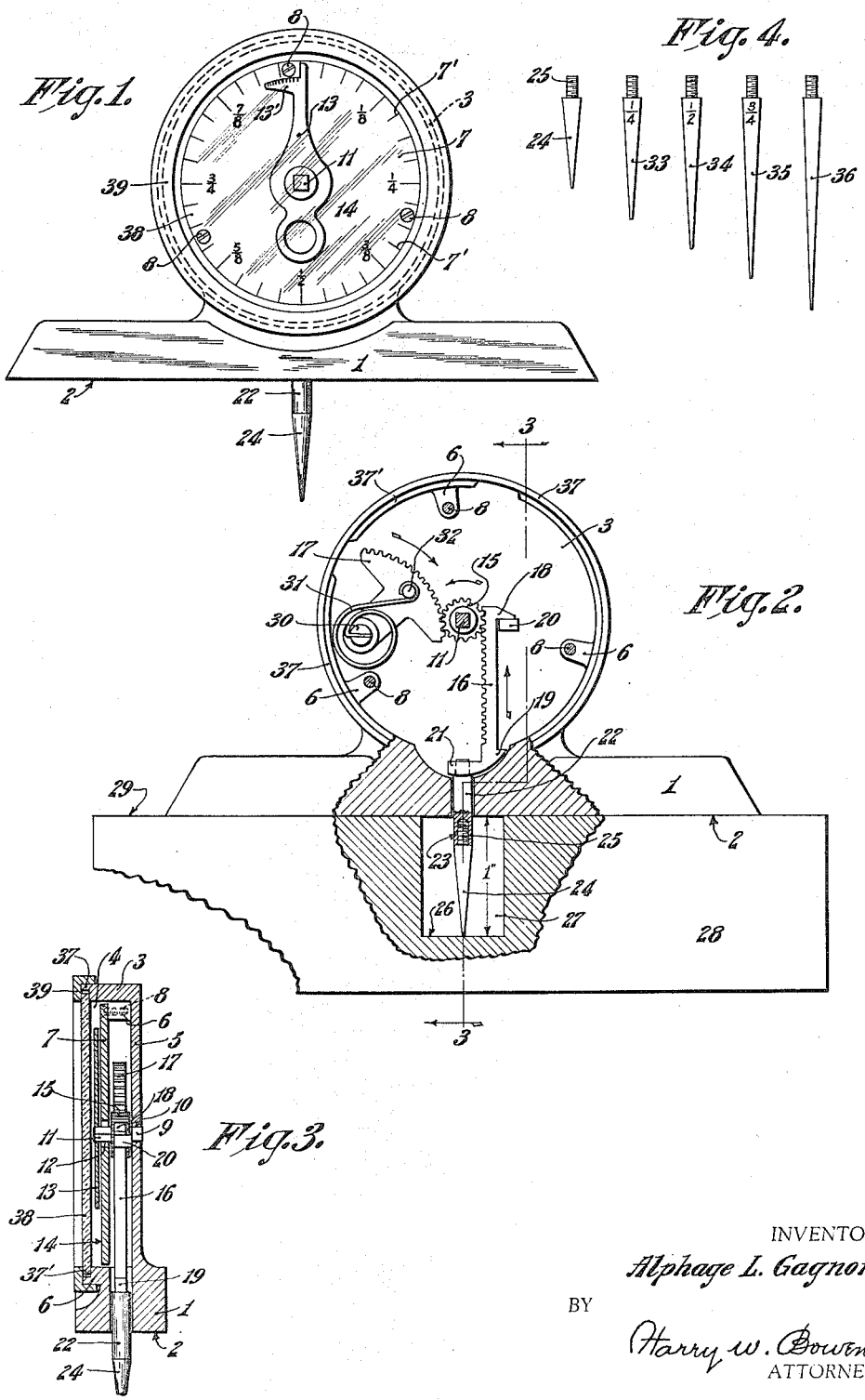
INVENTOR,
Alphage L. Gagnon,
BY
Harry W. Bowen,
ATTORNEY.

Patented Sept. 26, 1933

1,928,528

UNITED STATES PATENT OFFICE 1,928,528

DEPTH GAUGE

Alphage L. Gagnon, Chicopee, Mass., assignor of one-half to Earl C. Abbe, Springfield, Mass.

Application July 7, 1931. Serial No. 549,160

2 Claims. (Cl. 33—172)

My invention relates to improvements in depth gauges, and more particularly to that type of depth gauge adapted for measuring the depth of openings in machine work.

An object of my invention is to provide a depth gauge capable of fine precision readings, and one that is simple, sturdy, and economical of construction.

A further object of my invention is to provide a depth gauge with which fine dimensions may be read at a glance without undue eye strain.

A still further object of my invention is to provide means in co-operation with the depth gauge whereby it may be adapted for use in measuring openings having a wide range in depth.

These and other objects of my invention will appear and be more fully explained in the specification, the accompanying drawing, and the appended claims.

Broadly, my invention comprises a casing member formed with an anvil or base portion, a dial secured within the casing, a pointer secured to a shaft mounted in said casing and capable of revolving over the face of the dial, means in engagement with the shaft for revolving the shaft, a plurality of depth measuring points of variable lengths, any one of which may be readily removed and secured to said means for actuating the same when the end of said point comes into contact with the bottom of an opening in a piece of work as the gauge is pressed down upon the face of the work until the anvil or base portion rests flat upon the work, and means for returning the pointer to the zero position on the dial, when the pressure on the point is released.

A preferred embodiment of my invention is illustrated in the accompanying drawing, in which:

Fig. 1 is an elevational view showing the face of the gauge, the dial pointer, and the point which is extended into an opening for measuring its depth.

Fig. 2 is a view partially in section with the dial and pointer removed, illustrating the interior mechanism for operating the pointer.

Fig. 3 is a sectional view on the line 3—3 of Fig. 2, and

Fig. 4 is a view illustrating a set of removable points of varying lengths used in co-operation with the gauge.

Referring now to the drawing in detail, in which like numerals refer to like parts throughout:

The anvil or base portion 1 having the flat, straight bottom surface 2, has formed on its upper surface, the casing portion 3. This casing is formed with the open front 4 and the solid back 5. Lugs 6 provide bearings for the dial 7 which is secured to the lugs 6 by the screws 8. The shaft 9, having a bearing in the opening 10 formed in the back portion 5 of the casing, is formed with the square portion 11 which extends through the opening 12 in the dial 7 and to which is secured the pointer 13 on the outer face 14 of the graduated dial 7. Mounted on the square portion 11 of the shaft 9, between the dial 7 and the back 5 is the gear 15, which is in constant engagement with the rack 16 and the quadrant 17. The rack 16 is formed with the stop lugs 18 and 19, which engage the stop 20 formed on the back 5 to limit the extreme travel of the rack 16. The rack 16 is also formed with the laterally extended boss 21, in which is secured the short shaft 22 formed with the threaded opening 23. The shaft 22 extends downwardly through an opening in the anvil portion 1, and the measuring pin 24 formed with the threaded shank 25 is removably secured in the opening 23. The rack 16 actuates the gear 15, and thereby the pointer 13 in the directions indicated by the arrows in Fig. 2, when the rack 16 is moved upward by contact of the pin 24 against the bottom surface 26 of an opening 27 in a piece of work 28 as the anvil portion 1 is pressed downwardly into engagement with the surface 29 of the work 28. The gear 15, pointer 13, and rack 16 are returned to normal position, when pressure on the pin 24 is released by the quadrant 17, which is pivotally secured to the back 5 by the stud 30. The quadrant 17 is actuated for movement in a direction opposite to that indicated by the arrows in Fig. 2 by means of the spring 31, one end of which is secured to the stud 30 and the opposite end to the pin 32.

The normal projection of the measuring pin 24 below the anvil 1, and the distance between the stop 19 and the stop 20 or the stop 18 and the stop 20, as the case may be, are equal to the total distance depicted on the face of the dial 7. For purposes of illustration, I have shown this distance to be one inch, divided, as indicated on the face of the dial in Fig. 1, but I do not confine myself to this arrangement, as it will be readily understood that my gauge may be made in any practical size to measure depths in either English or metric systems of measurement. The pointer 13 is formed with a vernier scale 13', thereby providing for readings to one-tenth of the divisions 7', indicated on the dial. Fig. 4 illustrates a set of measuring pins 24, 33, 34, 35 and 36 which are used in co-operation with my gauge. If the depth of the opening to be measured exceeds the capacity of the length of pin 24, this pin is removed from the shaft 22 and the pin of proper length of the set, shown in Fig. 4, substituted therefor. The dimension stamped on the pin is added to the reading of the dial, thus obtaining the total depth of the opening measured. The casing 3 is formed with an extending flange 37 which forms a rabbet 37' in which is secured the glass 38, that is held in place by the cap or bezel member 39.

In operation, the gauge is pressed downwardly over the opening to be measured with the pin 24 extending into the opening. When the end of the pin comes into contact with the bottom of the opening, the pointer 13 begins to move over the graduations 7' of the dial 7 in an anti-clockwise direction, and continues to move until the surface 2 of the anvil 1 comes into contact with the surface 29 of the work 28, at which time the pointer indicates on the face of the dial, the depth of the opening.

What I claim is:

1. A depth gauge comprising a cylindrical casing formed with a rectangular flat elongated bottom surface, a square shaft, a graduated dial secured in said casing, a pointer pivotally secured on the square shaft in said casing, a tapered measuring pin slidably secured in said casing and extending downwardly below said flat bottom surface, a gear secured on said square shaft, a rack connected to said measuring pin and in engagement with said gear for the purpose of actuating said pointer over said dial when pressure is brought to bear on the measuring pin, said rack being formed with a channel-shaped recess, stop means for limiting the upward and downward movement of said rack comprising a stop post formed on the back of said casing and engaged in said channel-shaped recess and means for returning the rack and pointer to a normal zero position when pressure on the measuring pin is released, said means comprising a spring actuated quadrant pivotally secured in said casing and in engagement with said gear.

2. A depth gauge comprising, in combination, a cylindrical casing formed with a flat bottom work engaging surface and an open end, a graduated dial secured within said casing, a shaft rectangular in cross section, a pointer pivotally secured on the said shaft in said casing and movable over the surface of said dial and formed with a vernier scale co-operating with the graduated divisions on said dial, transparent protective material secured in the open end of said casing over said dial and said pointer, a gear secured to the shaft, a rack slidably mounted in said casing and in engagement with said gear, stop portions formed on said rack, a stop member on said casing for the purpose of engaging both of said stop portions to limit the travel of said rack, a part secured to said rack and extending downwardly through the flat bottom surface and below said flat bottom surface, a measuring point removably secured to said part for the purpose of actuating the rack, gear, and pointer when pressure is brought to bear on said measuring point, and a spring actuated quadrant pivotally secured within said casing in engagement with said gear for the purpose of returning the gear pointer, rack, and measuring point back to its normal position when pressure on the measuring point is removed.

ALPHAGE L. GAGNON.